United States Patent
Bagepalli et al.

[11] Patent Number: 5,400,586
[45] Date of Patent: Mar. 28, 1995

[54] SELF-ACCOMMODATING BRUSH SEAL FOR GAS TURBINE COMBUSTOR

[75] Inventors: Bharat S. Bagepalli, Schenctady; Osman S. Dinc, Troy; John Barnes, Schnectady; Robert Cromer, Johnstown; Imdad Imam, Niskayuna, all of N.Y.

[73] Assignee: General Electric Co., Schenectady, N.Y.

[21] Appl. No.: 140,477

[22] Filed: Oct. 25, 1993

Related U.S. Application Data

[63] Continuation-in-part of Ser. No. 920,879, Jul. 28, 1992, Pat. No. 5,265,412.

[51] Int. Cl.$^6$ ............................................. F02C 7/20
[52] U.S. Cl. ................................. 60/39.32; 277/53; 415/134
[58] Field of Search .............. 60/39.32, 39.31, 752; 277/53, 55, 56, 57; 415/134, 137, 138

[56] References Cited

U.S. PATENT DOCUMENTS

| | | |
|---|---|---|
| 2,709,338 | 5/1955 | Morley et al. |
| 3,186,168 | 6/1965 | Ormerod et al. |
| 3,463,498 | 8/1969 | Bill |
| 3,759,038 | 9/1973 | Scalzo et al. |
| 3,841,643 | 10/1974 | McLean ........................ 277/57 |
| 4,195,476 | 4/1980 | Wood |
| 4,202,554 | 5/1980 | Snell |
| 4,358,120 | 11/1982 | Moore |
| 4,422,288 | 12/1983 | Steber |
| 4,567,730 | 2/1986 | Scott |
| 4,781,388 | 11/1983 | Wohel et al. ................. 277/53 |
| 4,785,623 | 11/1988 | Reynolds |
| 4,901,522 | 2/1990 | Commaret et al. |
| 4,998,739 | 3/1991 | Weiler ........................... 277/53 |
| 5,074,748 | 12/1991 | Hagle ............................ 277/53 |
| 5,076,590 | 12/1991 | Steinetz et al. |
| 5,090,710 | 2/1992 | Flower |
| 5,106,104 | 4/1992 | Atkinson et al. |
| 5,114,159 | 5/1992 | Baird et al. |
| 5,181,728 | 1/1993 | Stec .............................. 277/53 |
| 5,201,530 | 4/1993 | Kelch et al. ................... 277/55 |

FOREIGN PATENT DOCUMENTS

| | | |
|---|---|---|
| 0453315 | 10/1991 | European Pat. Off. |
| 2938484 | 3/1981 | Germany |
| 421302 | 5/1947 | Italy |

*Primary Examiner*—Richard A. Bertsch
*Assistant Examiner*—M. Kocharov
*Attorney, Agent, or Firm*—Nixon & Vanderhye

[57] ABSTRACT

The gas turbine includes a combustor 10 having a transition piece 18 with its exit end spaced from a first-stage nozzle 22. A brush seal 26 seals about the space between the transition piece and first-stage nozzle. The brush seal includes a sealing cap 28 supported by one of the transition piece and the first-stage nozzle and having a portion 38 overlying the other of the transition piece and first-stage nozzle. A seal ring 30 is secured to the other of the transition piece and the first-stage nozzle and carries bristles 32 projecting therefrom for engagement with the overlying portion 38 of the sealing cap 28 to seal the gap between the transition piece and the first-stage nozzle. In one form, the side face portions of the bristles of the bristle pack form the seal by engaging against a planar sealing surface.

14 Claims, 4 Drawing Sheets

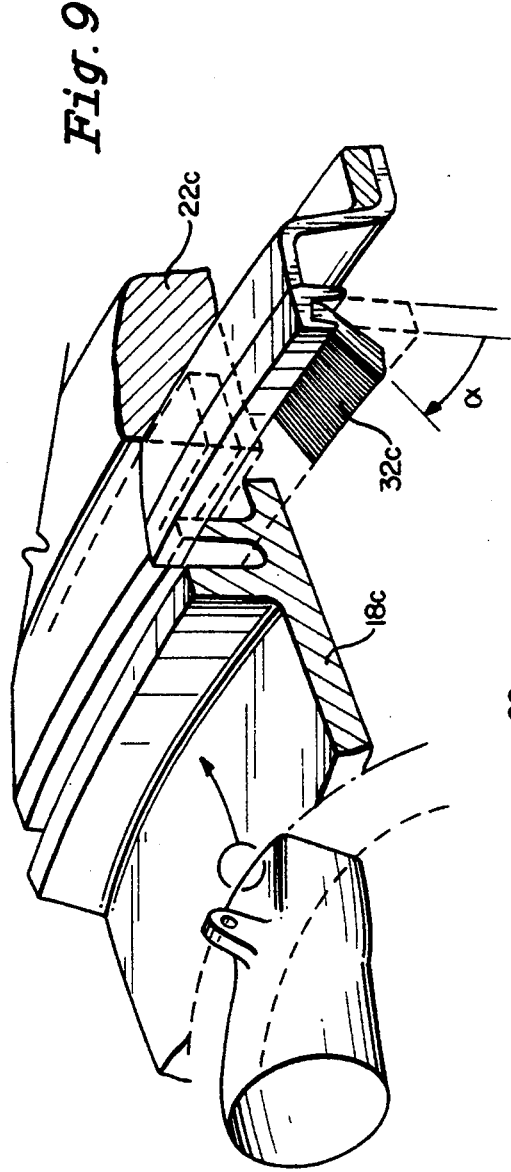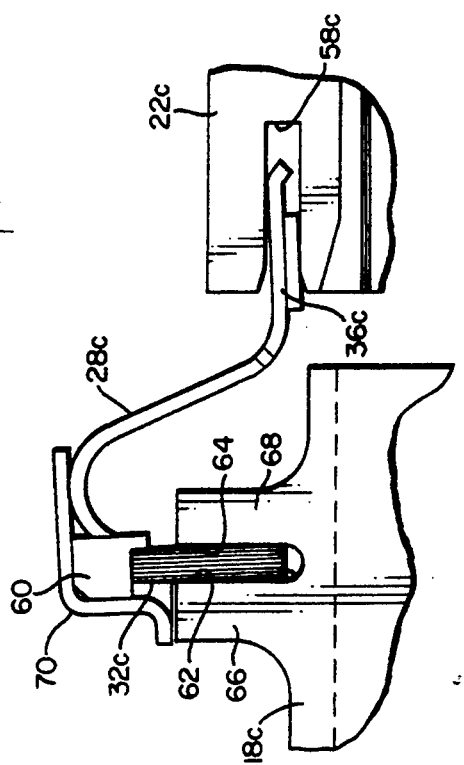

SELF-ACCOMMODATING BRUSH SEAL FOR GAS TURBINE COMBUSTOR

RELATED APPLICATIONS

This is a continuation-in-part of application Ser. No. 07/920,879, filed Jul. 28, 1992, now U.S. Pat. No. 5,265,412, the disclosure of which is incorporated herein by reference.

TECHNICAL FIELD

The present invention relates to brash seals and particularly relates to brush seals for use in sealing the space between combustor transition pieces and the first-stage nozzle in a gas turbine.

BACKGROUND

In gas turbines, a plurality of combustors are conventionally disposed in an annular array about the axis of the machine. Hot gases of combustion flow from each combustor through a transition piece into the first-stage nozzle. Because the transition pieces and the first-stage nozzle are formed of different materials and are subjected to different temperatures during operation, they experience different degrees of thermal growth. That is, both the transition pieces and the first-stage nozzle support elements move radially, circumferentially and axially relative to one another as a result of thermal growth. Also, similar relative movement occurs as a result of the dynamic pulsing of the combustion process. Thus, the time-variable mismatch at the junction of the transition pieces and the first-stage nozzle support elements, as a result of the thermal growth and dynamic spacing of these elements, requires an effective seal to contain the combustion products and the pressure differential across this space, while accommodating these dimensional changes in the radial, circumferential and axial directions.

Prior seals between transition pieces and first-stage nozzle elements typically have included relative rigid angled brackets for the top and bottom of the first-stage nozzle and a block of grooved metal that has lips that mesh with the corresponding grooves in each transition piece or the first-stage nozzle. Relative motion and thermal growth between the transition pieces and the first-stage nozzle are accommodated by the free movement of these parts, although such movement is limited by the lip-and-groove arrangement. Excessive wear of the mating parts in this type of seal occurs and necessitates undesirable frequent inspection intervals and shut-down for replacement.

Brush seals have been utilized in many environments in the past, usually between a stationary part and a rotating element. In U.S. Pat. No. 4,781,388, however, there is disclosed a brash seal for use in a gas turbine for sealing between relatively stationary parts and to accommodate dimensional differences caused by thermal growth and the dynamics of the system. However, the disclosed brash seals require a receiving element in the form of a fork for confining the distal ends of the bristles. Moreover, they are not used in sealing the space between combustion transition pieces and first-stage nozzles.

DISCLOSURE OF THE INVENTION

In one form of the present invention, there is provided a brash seal for sealing between the transition pieces and the first-stage nozzle in a gas turbine. The brash seal includes a sealing cap for enclosing the end of the transition piece. The sealing cap is preferably disposed in a groove in the first-stage nozzle and includes a portion which projects into overlying relation with a channel formed along the outside of the transition piece. A seal ting is disposed in the channel and carries a plurality of densely packed bristles which project outwardly from the seal ting for engagement of their distal ends or tips against the overlying cap portion. The bristles are maintained in the seal ting either by a press, i.e., a frictional retention by clamping a pair of ting plates together, or by welding the proximal ends of the bristles along the underside of one or both of the ting plates constituting the opposite sides of the seal ring.

The seal ring and sealing cap may each be formed unitarily of a single component piece or may each be comprised of discrete segments connected to one another. Alternatively, one may be unilaterally formed while the other is formed from discrete segments. A spring clip is disposed in the channel for urging the seal ting against one of the channel walls to prevent the differential pressure across the seal from flowing fluid between the seal ring and channel and bypassing the seal. With the foregoing described construction, the seal ting disposed in the transition piece channel and the bristles extending from the seal ring move with the transition piece as a result of its dynamic motion or thermal growth, or both. The bristles also accommodate movement of the fast-stage nozzle elements relative to the transition piece. Thus, the brash seal hereof enables a time-varying contact of the bristles along the sealing cap, thereby effectively sealing the juncture between the transition piece and the fast-stage nozzle, notwithstanding radial, axial or circumferential relative movement of the two parts and time varying differential spacing therebetween.

Alternatively, the sealing cap may be disposed in the channel of the transition piece and the seal ting disposed in a groove in the fast-stage nozzle. The bristles, of course, project from the seal ting to engage against a portion of the sealing cap.

While the engagement of the tips of the brash seal bristles against the sealing surface of the sealing cap provides an effective seal therewith, it has been found that an even more effective brush seal may be provided by engaging the side faces of the bristles of a bristle pack against a sealing surface rather than the tips of the bristles against the sealing surface. In the context of a brash seal for use in sealing between the transition piece and a first-stage nozzle, a sealing cap may be slidably mounted in a slot in the first-stage nozzle structure and extends across the gap between the first-stage nozzle and the transition piece to overlie a sealing surface carded by the transition piece. Particularly, the sealing cap carries a brush seal mount which supports a plurality of elongated brash bristles projecting outwardly from the mount in the form of a bristle pack lying in a plane. The sealing surface on the transition piece extends substantially coplanar with the plane of the bristles of the bristle pack, with side face portions of the bristles engaging against the sealing surface to form the seal. Moreover, where spaced but opposed sealing surfaces are provided for receiving the bristle pack therebetween, the movement of the transition piece and first-stage nozzle toward and away from one another will cause the opposite side face portion of the bristle pack to sealingly engage one the respective sealing surfaces of the transition piece. Additionally, while it is advantageous to provide bristles of substantial length to increase the sealing area of the bristles against the sealing surface, the bristles should not have a length such that their tips engage another surface as the parts move relative to one another. Should the tips engage that surface, the bristles will buckle and the effectiveness of the seal will deteriorate. To overcome this problem, the bristles of the bristle pack are canted such that the long axis of the bristles does not extend perpendicular to any surface engageable with the tips of the bristles in response to relative to movement of the transition piece and first-stage nozzle. By providing bristles extending at an angle in the plane of the bristles, any contact between the bristle tips and the surface otherwise normal to the axis of the bristles will cause a deflection rather than a buckling of the bristles whereby the bristles maintain the effectiveness of the seal between the side face portions thereof and the sealing surface.

In a preferred embodiment according to the present invention, there is provided a gas turbine comprising a first-stage nozzle, a combustor having a transition piece for flowing hot gases of combustion from the combustor to the first-stage nozzle, the transition piece being spaced from the fast-stage nozzle and defining a gap therebetween. A brash seal is disposed between the transition piece and the fast-stage nozzle, sealing the space therebetween, the brash seal including a sealing cap carded by one of the transition piece and the first-stage nozzle and a scaling surface carded by another of the transition piece and the fast-stage nozzle, the brush seal further including a brush seal mount carrying a plurality of elongated brush bristles projecting outwardly from the mount across the gap and lying in a plane, the sealing surface extending substantially in a plane parallel to the plane of the bristles such that side face portions of the bristles engage against the sealing surface to form the seal.

In a further preferred embodiment according to the present invention, there is provided a gas turbine comprising a first-stage nozzle, a combustor having a transition piece for flowing hot gases of combustion from the combustor to the fast-stage nozzle, the transition piece being spaced from the fast-stage nozzle and a brush seal between the transition piece and the fast-stage nozzle sealing the space therebetween, the brush seal including a brush seal mount carried by one of the transition piece and the first-stage nozzle and a sealing surface carried by another of the transition piece and the fast-stage nozzle, the brash seal mount carrying a plurality of elongated brash bristles projecting from the mount and lying in a plane, the sealing surface extending substantially in a plane parallel to the plane of the bristles such that side face portions of the bristles engage the sealing surface to form the seal.

In a further preferred embodiment according to the present invention, there is provided a brush seal between adjacent surfaces comprising a fast member, a second member spaced from the fast member and a brash seal between the fast and second members sealing the space therebetween, the brash seal including a brush seal mount carried by one of the first and second members and a sealing surface carried by another of the fast and second members, the brush seal further including a brash seal mount carrying a plurality of elongated brash bristles projecting from the mount and lying in a plane, the sealing surface extending substantially in a plane parallel to the plane of the bristles such that side face portions of the bristles engage the sealing surface to form the seal.

Accordingly, it is a primary object of the present invention to provide a novel and improved brush seal for effectively sealing the space between the transition pieces and the fast-stage nozzle in a gas turbine combustor.

BRIEF DESCRIPTION OF THE DRAWINGS

FIG. 9 is a fragmentary perspective view with portions in cross-section illustrating a further form of brash seal in accordance with the present invention; and FIG. 10 is a fragmentary side elevational view thereof.

BEST MODE FOR CARRYING OUT THE INVENTION

Reference will now be made in detail to a present preferred embodiment of the invention, an example of which is illustrated in the accompanying drawings.

Figure 1:
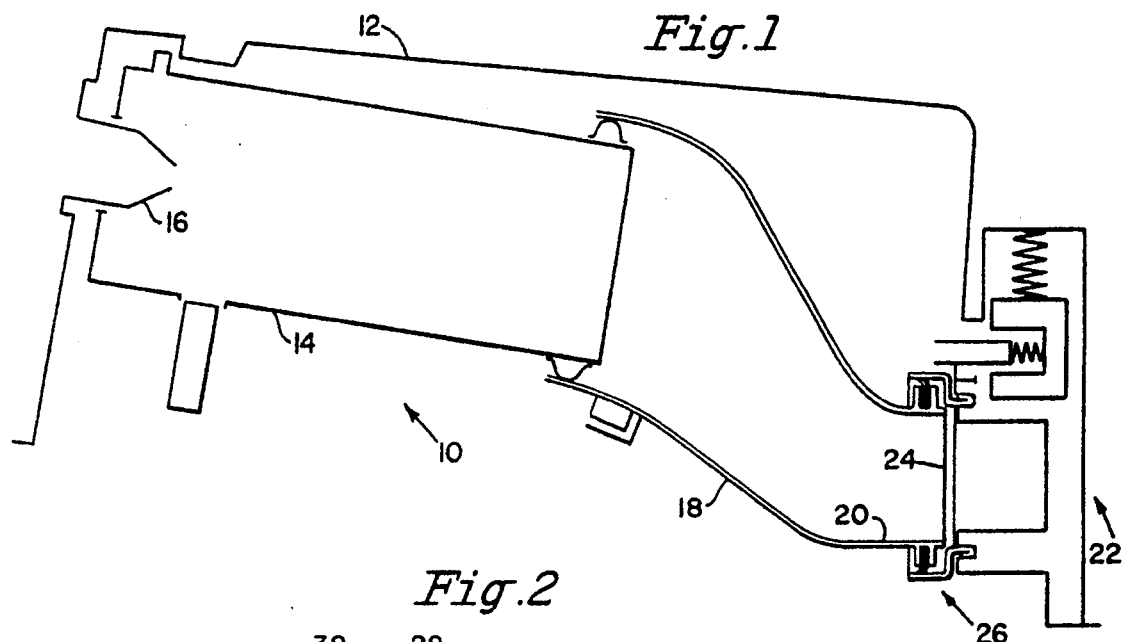
FIG. 1 is a schematic illustration of a combustor for a gas turbine with a brush seal between its transition piece and a fast-stage nozzle according to the present invention.

Referring now to the drawings, particularly to FIG. 1, there is schematically illustrated a combustor, generally designated 10, for a gas turbine and which combustor generally includes a flow sleeve 12, a liner 14, a nozzle 16 and a transition piece 18. At the exit end 20 of the transition piece 18, a first-stage nozzle, generally designated 22, is provided for receiving the hot gases of combustion from the combustor. The combustor 10 may be conventional in construction and further description thereof is not believed necessary. Suffice to say that, in a gas turbine, there are a plurality of combustors disposed in an annular array, each coupled with a corresponding transition piece 18 similarly disposed in an annular array about the axis of the turbine for flowing hot gases of combustion through the first-stage nozzle and downstream to the buckets.

FIG. 1 also illustrates, at 24, the space between the exit end of transition piece 18 and the first-stage nozzle 22. Because these latter elements are of different configuration relative to one another, are formed of different materials and are subjected to different temperatures, it will be appreciated that there is relative movement between the exit end of transition piece 18 and the first-stage nozzle 22 in radial, circumferential and axial directions in response to the dynamics of the combustor and thermal growth. The present invention provides a brash seal between the transition piece and the first-stage nozzle which are generally considered nonmovable, except for the slight movement caused by the dynamics of the combustor and thermal growth. The brash seal is generally designated 26 in FIG. 1 and seals the space 24 by accommodating such movement.

Figure 2:
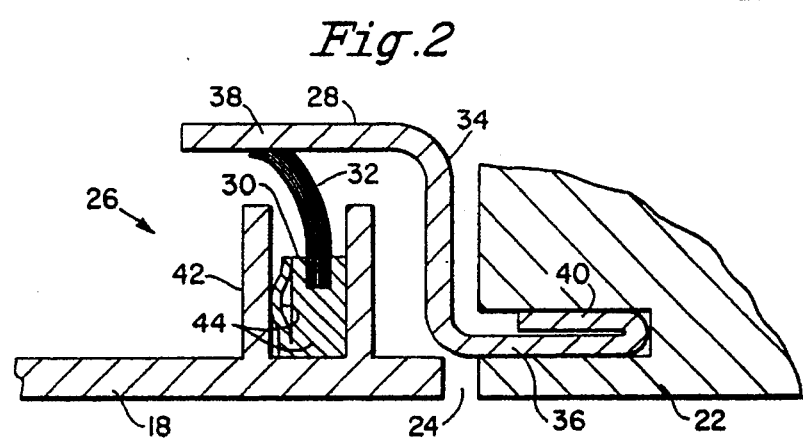
FIG. 2 is an enlarged fragmentary cross-sectional view illustrating brush seal between the transition piece and the fast-stage nozzle.
Figure 3:
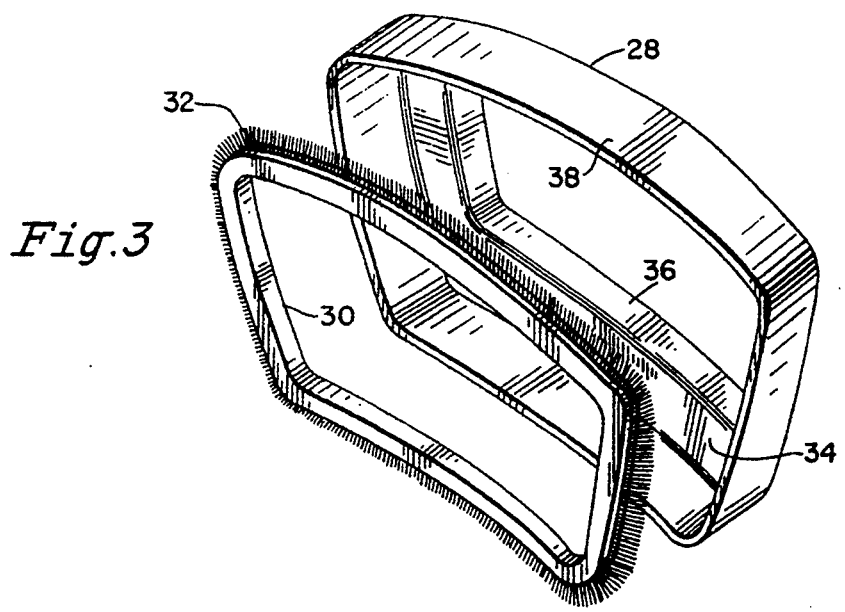
FIG. 3 is a perspective view illustrating the sealing cap and seal ring.

Referring now to FIG. 2, brush seal 26 includes a sealing cap 28 and a seal ring 30 having bristles 32 projecting outwardly from the seal ting 30. In this illustrated form of the brash seal, the sealing cap 28 is generally formed of a single unitary part having a generally Z-shaped cross-section, as illustrated in FIG. 2, with an intermediate portion 34 and opposite end portions 36 and 38. End portion 36 has a reversely tamed flange 40 and the end portion 36 and flange 40 are received in an axially rearwardly extending groove formed in the first-stage nozzle 22. The opposite end portion 38 of sealing cap 28 overlies seal ting 30 and also encompasses the exit end of the transition piece.

Figure 4:
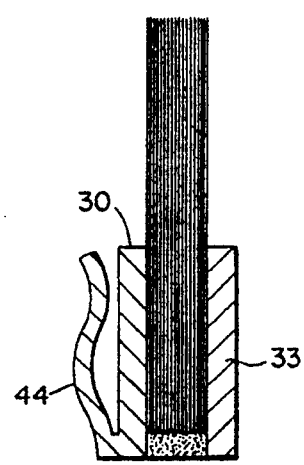
FIG. 4 is an enlarged cross-sectional view illustrating one form of connector between the brush seal bristles and the seal ting.

Transition piece 18 has an outwardly opening channel 42 about its periphery for receiving the seal ting 30 and which channel 42 lies in spaced opposition to the overlying end portion 38 of cap 28. Seal ting 30 may include a base having a groove for mounting bristles 32 or, as in FIG. 4, may comprise a pair of plates 33 suitably clamped one to the other with the proximal ends of the bristles 32 frictionally retained between the plates. It will be appreciated that the distal ends of bristles 32 engage against the overlying end portion 38 to form a seal for the space 24. A spring clip 44 is provided on the back side of the base of the seal ring 30 to bias the base rearwardly into engagement against one of the walls defining the channel. In this manner, the fluid in space 24 cannot bypass the seal provided by bristles 32.

Figure 5:
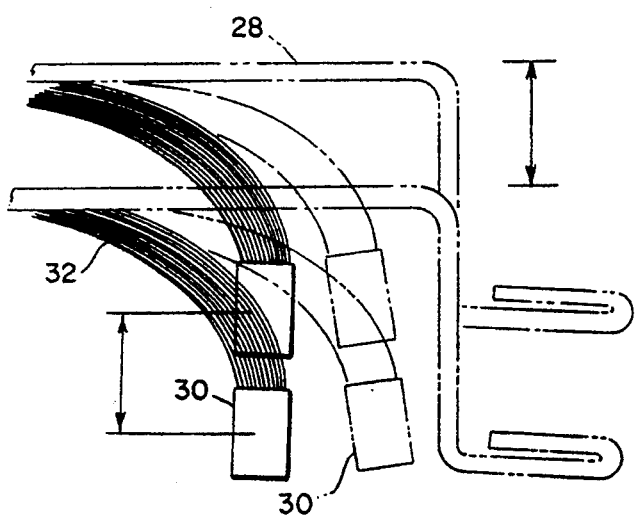
FIG. 5 is a schematic illustration of the movement of the elements of the brash seal in response to relative displacement of the transition piece and fast-stage nozzle.

As indicated previously, transition piece 18 and first-stage nozzle 22 are movable relative to one another and hence both carry their respective seal ting 30 and sealing cap 28 for movement therewith, as illustrated in FIG. 5. In FIG. 5, seal ting 30 is illustrated in two radial and axially displaced positions in conjunction with a radial displacement of the sealing cap 20. It will be appreciated that a relative circumferential movement may likewise occur. It will also be appreciated that bristles 32 engage the overlying end portion 38 of the sealing cap 28 for all relative displacements of the transition piece 18 and first-stage nozzle 22. Bristles 32, in all embodiments hereof, may be formed of a high temperature-resistant metal alloy, such as the nickel-based alloy identified as Hastalloy-X.

Figure 6:
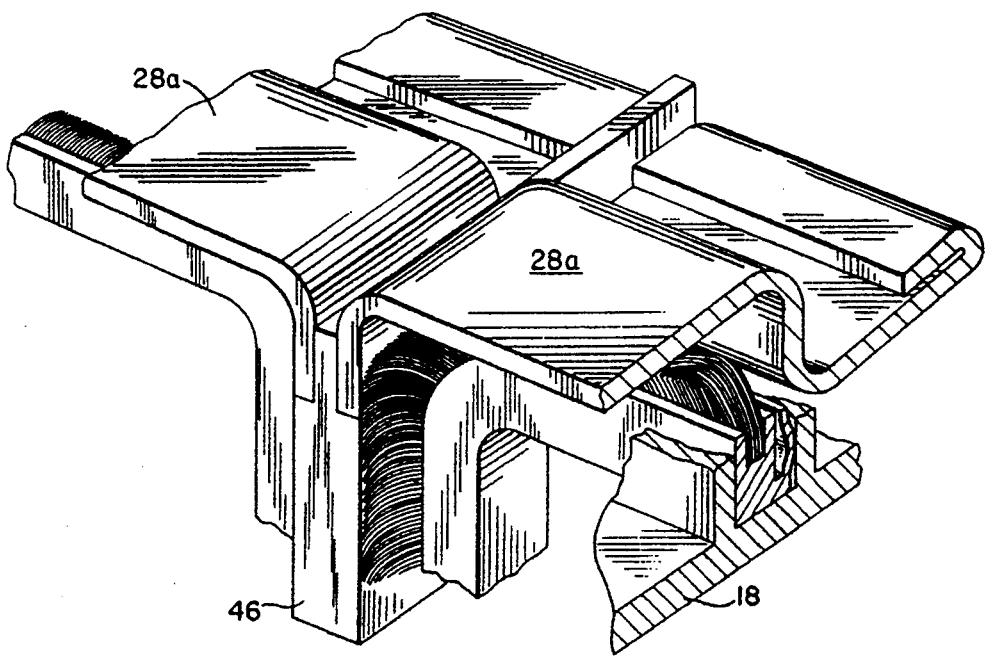
FIG. 6 is a fragmentary perspective view of a further embodiment of a brash seal according to the present invention.
Figure 7:
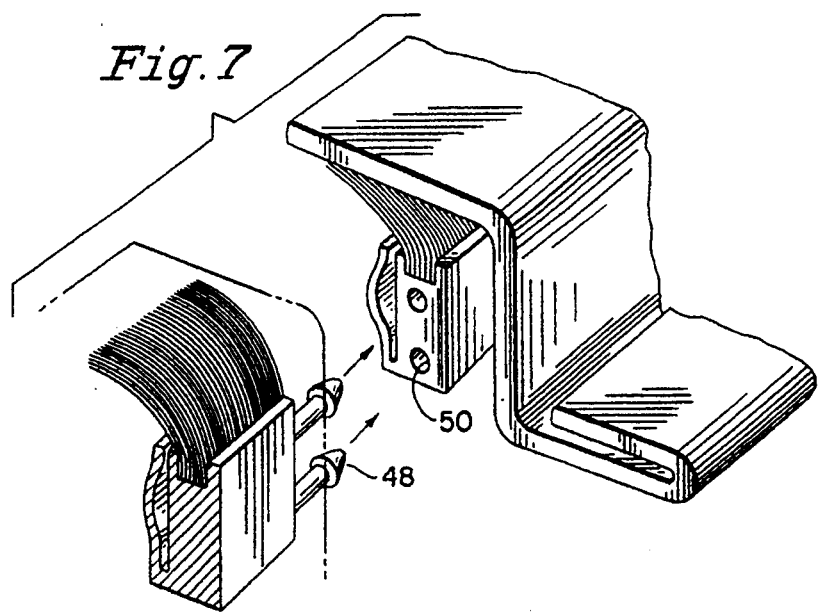
FIG. 7 is a fragmentary perspective view of the brash seal illustrating the manner in which seal ting segments may be secured one to the other.

While in the embodiments of FIGS. 1 through 5, both the seal ring and sealing cap are formed of integral parts defining complete enclosures about the transition piece or first-stage nozzle, respectively, the seal ring and sealing cap may be formed of seal ring segments and sealing cap segments, respectively. This is illustrated in FIGS. 6 and 7. For example, in FIG. 6, the sealing cap 28a for each transition piece of the illustrated adjoining transition pieces has top and bottom segments, only the top segments of the sealing caps 28a being illustrated. While each sealing cap 28a may have a pair of opposite side segments, a common side segment 46 for the circumferentially adjoining transition pieces may be provided in lieu thereof. The base of the seal ting may likewise be provided in seal ting segments. For example, as illustrated in FIG. 7, the seal ting may be divided into top, bottom and opposite side seal ting segments with the individual segments suitably joined one to the other. Pins 48 may be provided for reception in sockets 50 in the adjoining seal ting segment to secure the seal ting segments one to the other.

Figure 8:
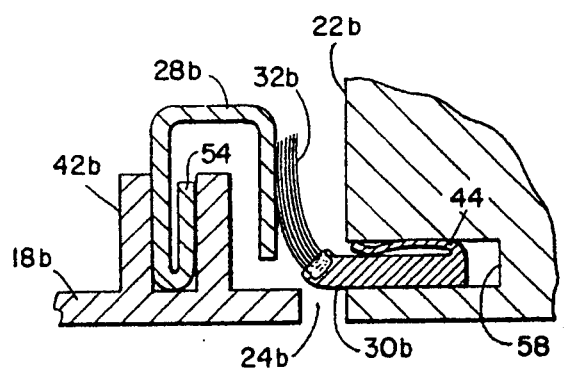
FIG. 8 is an enlarged cross-sectional view illustrating a further embodiment of the brush seal hereof.

Referring now to the embodiment hereof illustrated in FIG. 8, a transition piece 18b carries an outwardly projecting channel 42b and is in opposition to a first-stage nozzle 22b. The sealing cap 28b, in this embodiment, however, is generally in the form of a channel with one of the channel legs having a reversely bent flange 54 such that the one channel leg with the flange 54 may be received within the channel 42b of the transition piece 18b. The seal ting 30b with its accompanying spring clip 44b may be disposed in a rearwardly axially extending groove 58 formed in and about the first-stage nozzle 22b. The bristles 32b extend rearwardly from the seal ting 30b for engagement of their flat side faces against the other and opposite leg of the channel-shaped seal ting 28b as illustrated in FIG. 8. Thus, the gap 24b between the transition piece 18b and the first-stage nozzle 22b is sealed by the sealing ting, with the reversely turned flange 54 engaging a wall of channel 42b to prevent flow of fluid around the seal.

Referring to the drawing FIGS. 9 and 10, there is illustrated a further embodiment hereof comprised of a transition piece 18c and a first-stage nozzle 22c spaced one from the other with a sealing cap and brush seal disposed between the transition piece and first-stage nozzle. As in the previous embodiment of FIG. 8, the first-stage nozzle 22c has a slot 58c opening rearwardly. In this form, however, the sealing cap 28c has an end portion 36c received in the slot and mounting at its opposite end a brash seal mount 60. Brush seal mount 60 carries a plurality of bristles 32c in the form of a bristle pack and which bristles project or are cantilevered from the mount 60 toward the transition piece 18c.

The transition piece 18c has a pair of sealing surfaces 62 and 64 formed by a pair of outwardly projecting flanges 66 and 68, respectively, defining a slot for receiving the bristles of the bristle pack therebetween. As illustrated, the distal or free ends of the bristles of the bristle pack terminate short of the bottom of the slot defined between flanges 66 and 68. In this embodiment, the side face portions of the bristles of the bristle pack engage one or the other, or both, of the sealing surfaces 62 and 64 throughout substantially the entirety of the free length of the bristles along the opposite sides of the bristle pack. The seal between the bristles of the bristle pack and the sealing surfaces is thus formed by the side face portions rather than the distal tips of the bristles of the bristle pack as well as the closely contacting bristles in the bristle pack. An ancillary sealing cap 70 is provided over mount 60 to maintain the bristle pack in position.

With reference to FIG. 9, the bristle pack 32c is preferably canted in its own plane such that, should the relative movement of the transition piece 18c and first-stage nozzle 22c cause the bottom of the slot and the tips of the bristles to engage one another, a deflection action will occur rather than a buckling action. To this end, the bristles of the bristle pack 32c are angled in their plane, for example, as illustrated by the angle $a$ in FIG. 9. Consequently, any engagement between the tips of the bristles and the bottom of the sealing slot will be at other than a right angle to the long axis of the bristles such that the bristles will deflect rather than buckle, thereby effectively preserving the seal formed by the side face portions of the bristle pack against one or the other, or both, of the sealing surfaces.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A gas turbine comprising:
   a first-stage nozzle;
   a combustor having a transition piece for flowing hot gases of combustion from said combustor to said first-stage nozzle, said transition piece being spaced from said first-stage nozzle;
   a brush seal between said transition piece and said first-stage nozzle, sealing the space therebetween, said brush seal including a sealing cap and a sealing surface, said brush seal further including a brush seal mount carrying a plurality of elongated brush bristles projecting outwardly from said mount and lying in a plane, said sealing surface and certain of said bristles extending substantially in a plane parallel to the plane of said bristles such that side face portions of said certain bristles register with and engage said sealing surface throughout substantially the entirety of the free length of the certain bristles in registration with the sealing surface to form said seal.

2. A gas turbine according to claim 1 wherein said transition piece and said first-stage nozzle are movable relative to one another to alter the spacing therebetween, said brushes having sufficient length to enable the side face portions thereof to seal between said transition piece and said first-stage nozzle throughout their relative movement.

3. A gas turbine according to claim 1 wherein said brush seal includes a second sealing surface spaced from and parallel to the first-mentioned sealing surface, said bristles being distributed to form a bristle pack having a length and width for disposition between and registration with said first and second sealing surfaces whereby opposite faces of said bristle pack are sealingly engageable against said registering surfaces, respectively, throughout substantially the entirety of the free length of the bristles of said pack extending between said first and second sealing surfaces.

4. A gas turbine according to claim 1 wherein said bristles are distributed to form a bristle pack having length and width dimensions generally perpendicular to the length of said bristles, said sealing surface having a length dimension generally parallel to the length dimension of the bristle pack and a depth dimension generally parallel to the length dimension of the bristles.

5. A gas turbine according to claim 1 wherein said sealing surface is carried by said transition piece and said bristles are carried by said first-stage nozzle.

6. A gas turbine according to claim 5 wherein said brush seal includes a second sealing surface spaced from and parallel to the first-mentioned sealing surface, said bristles being distributed to form a bristle pack having a length and width for disposition between and registration with said first and second sealing surfaces whereby opposite faces of said bristle pack are sealingly engageable against said registering surfaces, respectively, throughout substantially the entirety of the free length of the bristles of said pack extending between said first and second sealing surfaces.

7. A gas turbine according to claim 1 wherein said sealing surface is carried by said transition piece and said bristles are carried by said first-stage nozzle, said sealing cap being carried by said first-stage nozzle and having a portion overlying said transition piece, said mount being carried by said sealing cap.

8. A gas turbine according to claim 1 wherein said sealing surface is carried by said transition piece and said bristles are carried by said first-stage nozzle, said brush seal including a second sealing surface spaced from and parallel to the first-mentioned sealing surface, said bristles being distributed to form a bristle pack having a length and width for disposition between and registration with said first and second sealing surfaces whereby opposite faces of said bristle pack are sealingly engageable against said surfaces, respectively, throughout substantially the entirety of the free length of the bristles of said pack extending between said first and second sealing surfaces, said sealing cap being carried by said first-stage nozzle and having a portion overlying said transition piece, said mount being carried by said sealing cap.

9. A gas turbine comprising:
   a first-stage nozzle;
   a combustor having a transition piece for flowing hot gases of combustion from said combustor to said first-stage nozzle, said transition piece being spaced from said first-stage nozzle;
   a brush seal between said transition piece and said first-stage nozzle sealing the space therebetween, said brush seal including a brush seal mount and a sealing surface, said brush seal mount carrying a plurality of elongated brush bristles projecting from said mount and lying in a plane, said sealing surface and certain of said bristles extending substantially in a plane parallel to the plane of said bristles such that side face portions of said certain bristles register with and engage said sealing surface throughout substantially the entirety of the free length of the certain bristles in registration with the sealing surface to form said seal.

10. A gas turbine according to claim 9 wherein said transition piece and said first-stage nozzle are movable relative to one another to alter the spacing therebetween, said brushes having sufficient length to enable the side face portions thereof to seal between said transition piece and said first-stage nozzle throughout their relative movement.

11. A gas turbine according to claim 9 wherein said brush seal includes a second sealing surface spaced from and parallel to the first-mentioned sealing surface, said bristles being distributed to form a bristle pack having a length and width for disposition between said first and second sealing surfaces whereby opposite faces of said bristle pack are sealingly engageable against said surfaces, respectively, throughout substantially the entirety of the free length of the bristles of said pack extending between said first and second sealing surfaces.

12. A gas turbine according to claim 9 wherein said bristles are distributed to form a bristle pack having length and width dimensions generally perpendicular to the length of said bristles, said sealing surface having a length dimension generally parallel to the length dimension of the bristle pack and a depth dimension generally parallel to the length dimension of the bristles.

13. A gas turbine according to claim 9 wherein said sealing surface is carried by said transition piece and said bristles are carried by said first-stage nozzle.

14. A gas turbine according to claim 13 wherein said brush seal includes a second sealing surface spaced from and generally parallel to the first-mentioned sealing surface, said bristles being distributed to form a bristle pack having a length and width for disposition between said first and second sealing surfaces whereby opposite faces of said bristle pack are sealingly engageable against said surfaces, respectively, throughout substantially the entirety of the free length of the bristles of said pack extending between said first and second sealing surfaces.

* * * * *